United States Patent [19]
Walker

[11] Patent Number: 4,511,174
[45] Date of Patent: Apr. 16, 1985

[54] CAMPING AND RECREATION TRAILER

[76] Inventor: Mathew Walker, 297 N. Western, St. Paul, Minn. 55103

[21] Appl. No.: 490,726

[22] Filed: May 2, 1983

Related U.S. Application Data

[63] Continuation-in-part of Ser. No. 308,466, Oct. 5, 1981, abandoned.

[51] Int. Cl.³ ............................................. B60P 3/34
[52] U.S. Cl. .................................... 296/173; 296/27; 280/47.13 R; 280/475
[58] Field of Search ............................ 296/168–172, 296/174–176, 156, 26, 27; 280/656, 476 R, 475, 491 R, 491 B, 763, 12 S, 30, 639, 47.13 R

[56] References Cited

U.S. PATENT DOCUMENTS 3,180,654 4/1965 Westfall ............................... 296/168
3,705,743 12/1972 Toomey ............................... 296/168
3,820,805 6/1974 Tuomala ............................. 280/12 S
4,063,750 12/1977 Mutchler ............................ 280/763
4,167,284 9/1979 Messina .............................. 296/171

Primary Examiner—Robert R. Song
Attorney, Agent, or Firm—Jacobson & Johnson

[57] ABSTRACT

A camping and recreation trailer that can be used as an ice fishing house in winter, a summer picnicing unit, can be disassembled for storage and has a foldable hitch that locks the unit into a stable position.

7 Claims, 9 Drawing Figures

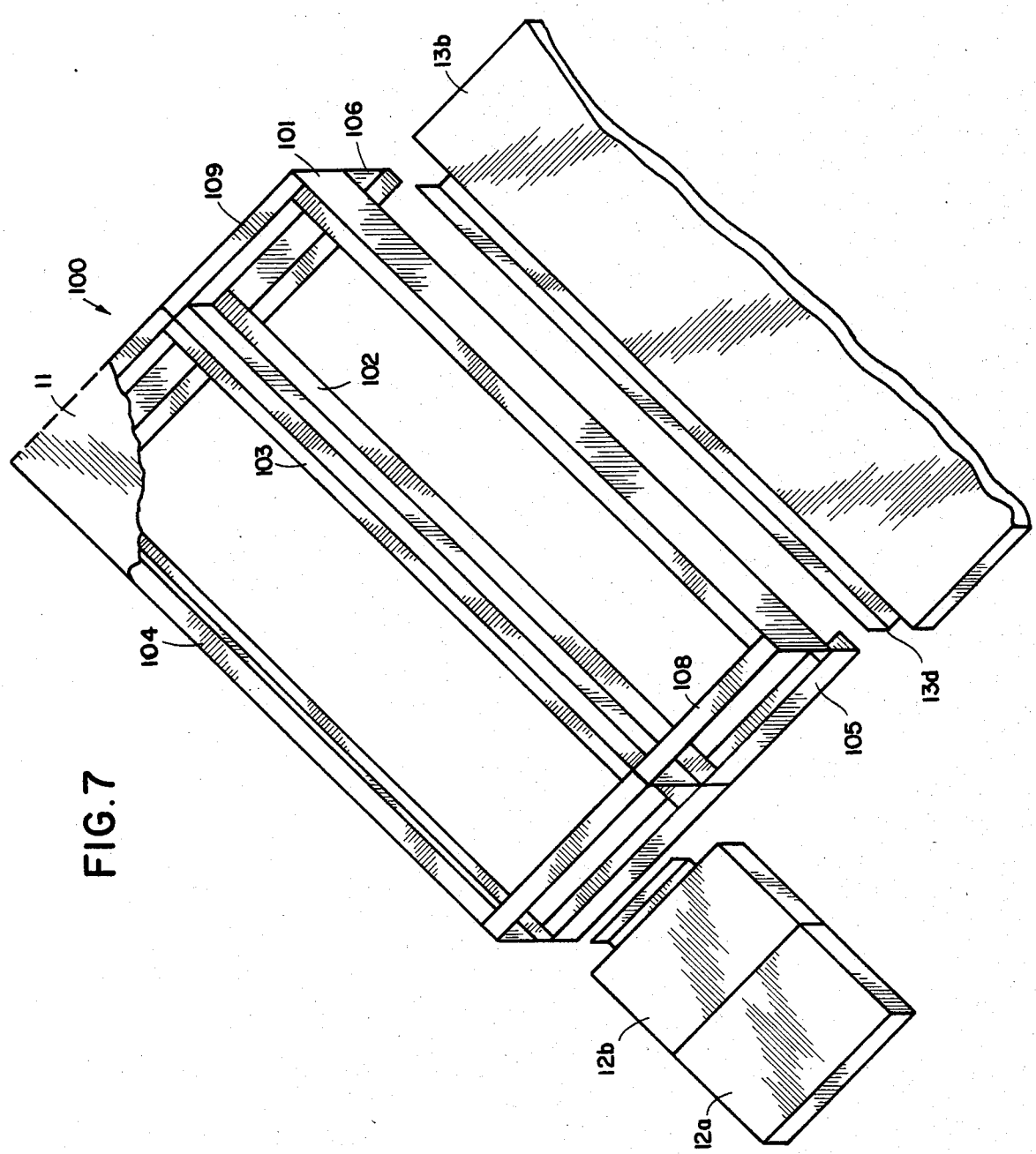

CAMPING AND RECREATION TRAILER

CROSS REFERENCE TO RELATED APPLICATION

This application is a continuation-in-part of earlier application Ser. No. 308,466 filed Oct. 5, 1981 now abandoned.

BACKGROUND OF THE INVENTION

Field of the Invention

This invention relates generally to recreation equipment and, more specifically, to a camping and recreation trailer suitable for summer or winter use.

Description of the Prior Art

Ekedal U.S. Pat. No. 3,781,030 shows a collapsible trailer with a rectangular frame that permits the trailer to be collapsed into a narrow elongated generally rectangular configuration. Stub shafts are longitudinally spaced from one another to rotatably support two pneumatic wheels.

Westfall U.S. Pat. No. 3,180,654 shows a combination trailer and picnic table in which the sides of the trailer fold out to form seats.

Stark U.S. Pat. No. 2,461,577 shows a collapsible military trailer which can be collapsed into a small space for storage.

Salichs U.S. Pat. No. 3,612,610 shows a folding utility trailer which can be folded lengthwise to a width slightly wider than the width of an individual wheel and then can be rolled into storage.

Greer U.S. Pat. No. 3,741,606 shows a picnic and camping trailer which has sides that fold out for table and benches that can slide out from the body. Storage is provided in the center portion of the trailer.

The Lieblein U.S. Pat. No. 1,820,466 shows an adjustable overhead support on a delivery wagon.

Hoeper U.S. Pat. No. 2,826,425 shows a trailer with a foldable bottom.

The Rear et al U.S. Pat. No. 2,879,072 shows a collapsible trailer that can be stored by folding the wheels beneath the trailer.

Keim U.S. Pat. No. 3,298,744 shows an underside foldable hitch for a truck to permit the truck to pull a wagon. Keil device stores out of the way when not in use but is used to provide proper elevation to the tongue of the trailer.

A review of the prior art reveals numerous recreation of camping trailers; however, none of the prior art units provide a vehicle for year-round use that can be stored compactly.

BRIEF DESCRIPTION OF THE DRAWING

FIG. 7 shows the internal framework of the canopy;

SUMMARY OF THE INVENTION

Briefly, my invention comprises a multiple use camping and recreation trailer that has a tongue that forms a stabilizing leg, sides that convert to benches and an adjustable sun or rain canopy, a barbecue unit, a storage unit with a frame and wheel mechanism that can be disassembled for storage. An opening in the trailer bed permits the winter time use of the trailer as an ice fishing house.

DESCRIPTION OF THE PREFERRED EMBODIMENT

Figure 1:
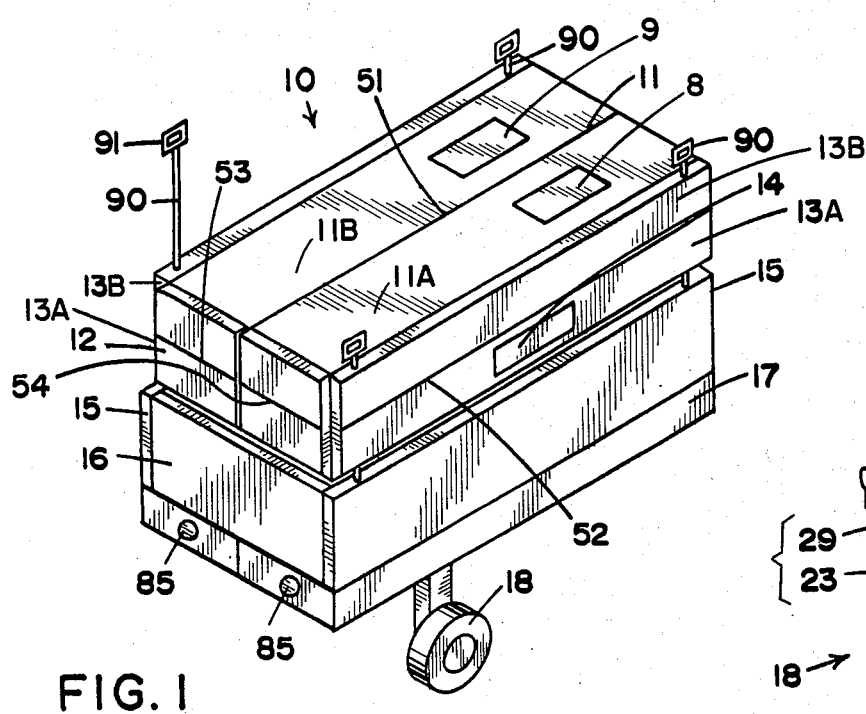
FIG. 1 shows my camping and recreation trailer in a partially exploded view.

Referring to the drawing, FIG. 1 shows my camping and recreation trailer 10 having a top section 11, an upward folding top end section 12 and upward folding top side sections 13 each having a window 14 therein. For purposes of illustration the top half of my camping and recreation trailer is spaced from the bottom half.

Figure 3:
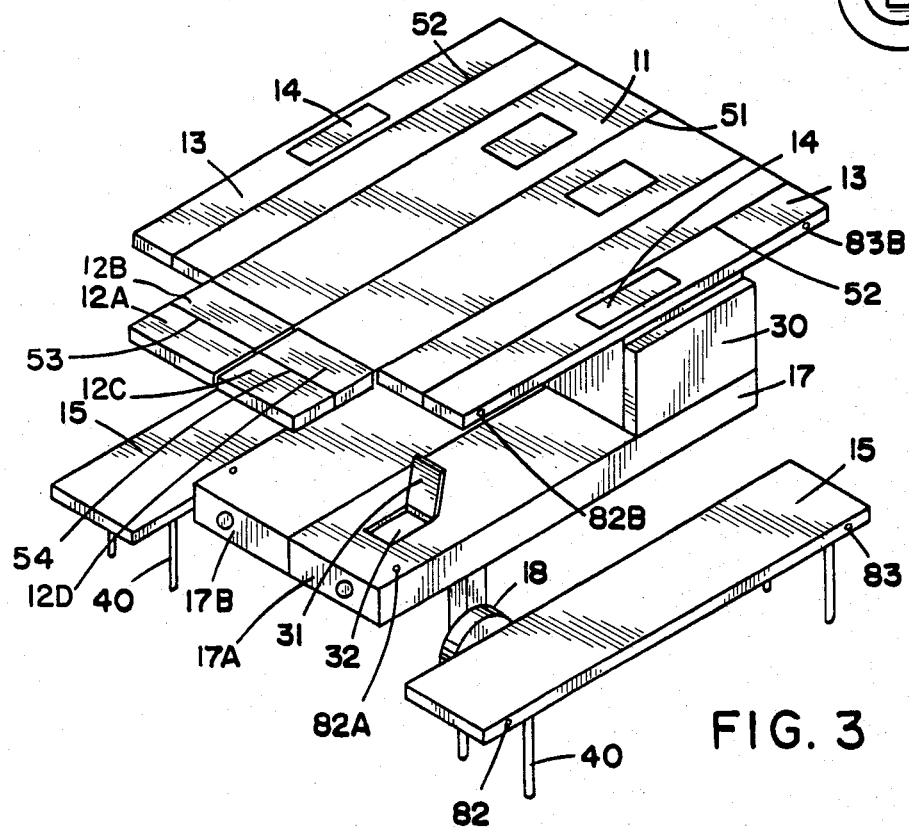
FIG. 3 shows my camping and recreation trailer in the picnic table mode.
Figure 9:
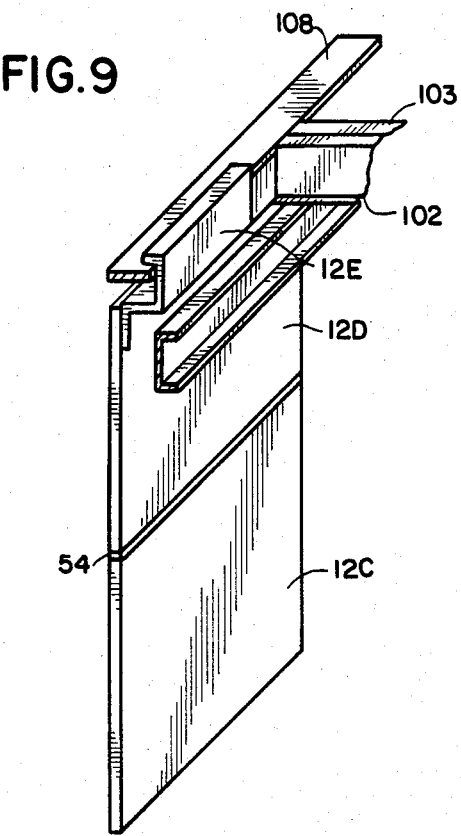
FIG. 9 shows the details of hooks for hanging the end sections.
Figure 8:
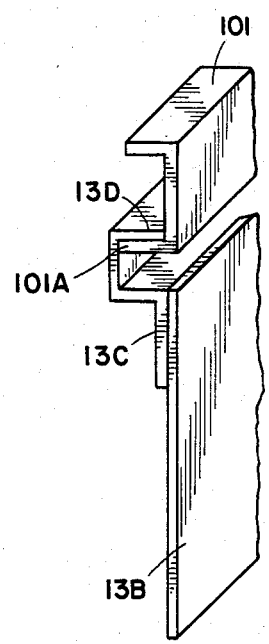
FIG. 8 shows the details of hooks for hanging side sections.

For ease in understanding the overall invention, FIGS. 1 and 3 show the relationship of top and side sections with the details of the track section and the end and side sections being shown in FIGS. 7, 8 and 9.

Figure 6:
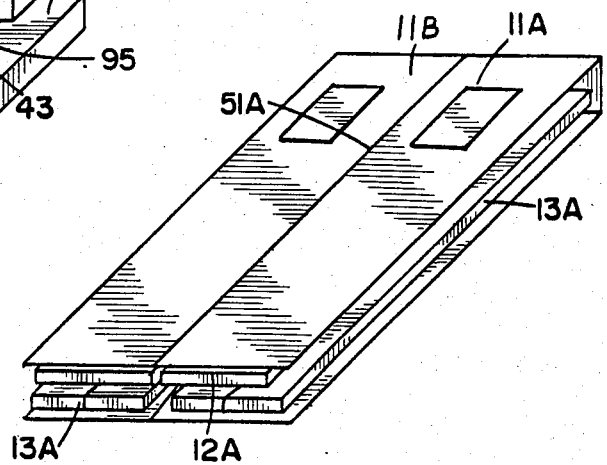
FIG. 6 shows the canopy.

The top section 11 is comprised of top sections 11A and 11B which hinge together to permit folding of top section 11 for storage when my camping trailer is disassembled. Top section 11 has windows 8 and 9. Extending down from opposite sides of top section 11 are two sets of side sections 13A and 13B which can be slid within the confines of top section 11. Side sections 13A and 13B are hinged together by a hinge 52 that extends the length of the side sections. Located on one end of top section 11 is a first set of end sections 12A and 12B and a second set of end sections 12C and 12D. First set of end sections 12A and 12B are hinged together by a hinge 53 and second set of end sections 12C and 12D are hinged together by hinge 54. The hinges are of the conventional type of continuous folding hinges and will not be described herein. The hinges permit folding of adjacent sections to provide full or partial opening in the sides of my camper. First set of end sections 12A and 12B and second set of end sections 12C and 12D are slidable within the confines of top section 11 by a track that supports the ends of each of the sections. A reference to FIG. 6 shows that the sides and ends can slide together and over each other while FIG. 7 shows the details of the internal track framework for sliding the end sections and side sections into top section 11.

Both sets of side sections 13A and 13B can be slid within the confines of the top section 11 as well as end sections 12A, 12B, 12C and 12D.

Referring to FIG. 7 there is shown the internal skeleton track frame which permits sliding of the side and ends into the top of camper 10. For ease in understanding, the top surface covering sheet of section 11 has been removed except for a corner section. Reference numerals 105 and 106 designate a pair of two piece C-shaped channel members which are located in a spaced parallel relationship with the open portion of channel members facing each other to provide a track for the ends of side section 13. Located transverse to channel members 105 and 106 and fastened on top of channel members 105 and 106 are two further sets of channel members, a first set 101 and 102 and a second set 103 and 104. The open portion of channel members 101 and 102 face each other to provide a track for end doors 12B and 12A to slide therein. Similarly, the open portion of channel members 103 and 104 face each other to provide a track for ends of doors 12C and 12D to slide therein. In operation the end sections and side sections can be slid completely within the internal framework.

In order to hold side section 13 and 14 in the extended position one can insert stiff rods lengthwise across trailer 10 by inserting them through opening 82B and 83B. The rods then provide support to hold sections 13A and 13B in the extended position as shown in FIG. 3.

Similarly, rods can be inserted through or under end sections 12A and 12B and end sections 12C and 12D to support the end sections 12A, 12B, 12C and 12D in a horizontal position as shown in FIG. 3.

Referring to FIG. 8 there is shown the detail of how section 13B can be hung from member 101. Located on the top portion of section 13B is a dipper-shaped member 13C which has a top lip 13A that fits over the lower lip 101A of channel 101. It will be envisioned that one can thus hang side section 13B from side section 101. Similarly, although not shown, one can hang the opposite side section from C-shaped channel member 104.

Figure 4:
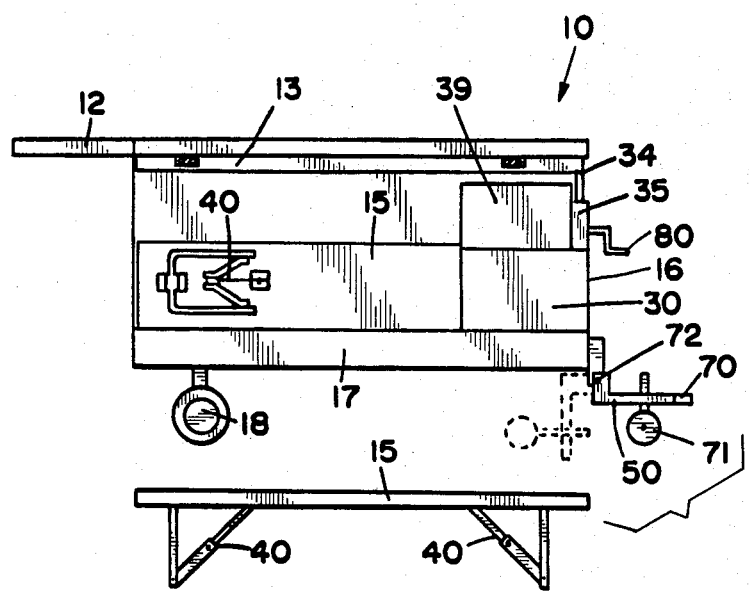
FIG. 4 shows a side view of my camping and recreation trailer.

Referring to FIG. 9 there is shown a partial sectional view of end section 12D hanging from member 108 by a dipper-shaped hook member 12E. Hook member 12E permits one to hang side section 12 vertically. Similarly, although not shown, one can hang end section 12B and 12A from member 108. In the normal transporting mode the top half and bottom half fit closely to each other. Top half of trailer 10 is held in position with respect to the bottom half by four rods 90 having hand grips 91 thereon. Rods 90 extend through alignment holes such as first set 82, 82A, 82B and a second set 83 and 83B (FIG. 3). Forming the bottom half of trailer 10 are a pair of side members 15, a rear end member 16 and a front end member 16 (FIG. 4). Located on the back of trailer main frame 17 are lights 85. Side members 15 are benches with attached folding legs 40 that can be extended to form a picnic bench such as shown in FIG. 3. Typically, side members 15 fasten to trailer 10 through bolts with wing nuts which permit rapid assembly and disassembly.

Figure 2:
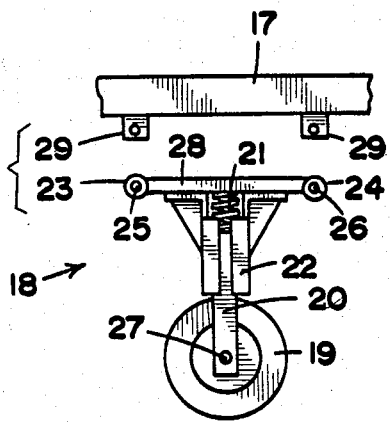
FIG. 2 shows the details of the wheel assemblies for my camping and recreation trailer.

A pair of wheel mechanisms 18 are located on opposite undersides of trailer main frame 17. As both wheel mechanisms are identical only one will be described herein. FIG. 2 shows wheel mechanism 18 comprising a wheel 19 supported by a vertical slidable member 20 and axle 27. Vertical member 20 slides within a housing 22 in accordance with the weight of the trailer and the compression or expansion of spring 21. Each wheel mechamism 18 contains a plate member 28 having on one end an elongated opening 23 thereon for receiving a pin 25. Similarly, the opposite end of plate member 28 has an elongated opening 24 for receiving a pin 26. In the normal towing condition pins 25 and 26 securely hold plate member 28 to opening brackets 29 which are located on the bottom and on each side of trailer frame 17. For storage of trailer 10 one can remove each of the wheel mechanisms by removing pins 25 and 26 or, if desired, one pin can be removed to permit tilting of the individual wheel mechanisms 18 to sideways position. Thus, one feature of the invention is my retractable or removable wheel mechanisms.

FIG. 3 shows my camping and recreation trailer in the picnic table mode. Top sides 12 and 13 are extended outward for use as a sun or rain shade. Note, side members 15 have been removed and set on the ground as benches.

FIG. 4 shows how side member 15 can be set alongside trailer 10 so that the trailer bottom 17 forms a picnic table. Thus, frame 17 and the folding mechanism 40 on side members permit my camping and recreation trailer to form a canopied picnic table. On the front of trailer 10 is a telescoping member 34 that can be raised or lowered in member 35 through rotation of crank 80 (FIG. 4). Typically, a rack and pinion arrangement is suitable if there is only one support; however, a cable suspension system works well if two or more telescoping top supports are used. As such are known in the art, they will not be described herein.

FIG. 3 also shows a trap door 31 and an opening 32 in the surface on trailer frame 17. While not utilized in the picnic table mode, trap door 31 forms an opening for an ice fisherperson to fish from within trailer 10. When used as an ice fishing house, windows 14 provide sunlight. That is, with my trailer in a condition shown as in FIG. 1 there is sufficient room therein for an ice fisherperson. In the ice fishing mode, end sections 12 and 16 which are hinged (not shown) can be opened and closed to permit entry into trailer 10.

Located at the front of my camping recreation trailer is a barbecue unit 39 having a charcoal draw 43, a grill 44 and a smoking compartment 45 with a lid 46. A smoke pipe 48 extends out from the back of barbecue 39. Located on the right of barbecue unit 39 is a removable storage compartment 30 for holding utensils or the like. Located on the left of barbecue is a storage unit 60 having compartments 41 and 42 for storage of articles therein. Located adjacent to storage unit 60 is a further storage unit having a top shelf 86 with a cover 88 having a handle 89 located over an opening in shelf 86. Located below cover 88 and attached to the opening in shelf 86 is a garbage bag 87.

FIG. 4 shows a further feature of the present invention which comprises a trailer tongue 50 which has a wheel 71 thereon for rolling trailer 10 into a convenient location. Once in proper location, tongue 50 is folded under trailer 17 by pivoting tongue 50 about picot pin 72. In the folded under position (dotted lines) the end 70 of tongue 50 acts as a stabilizing leg to prevent further movement of trailer 10. If desired, tongue 50 can be locked in position to the undersides of frame 17.

Figure 5:
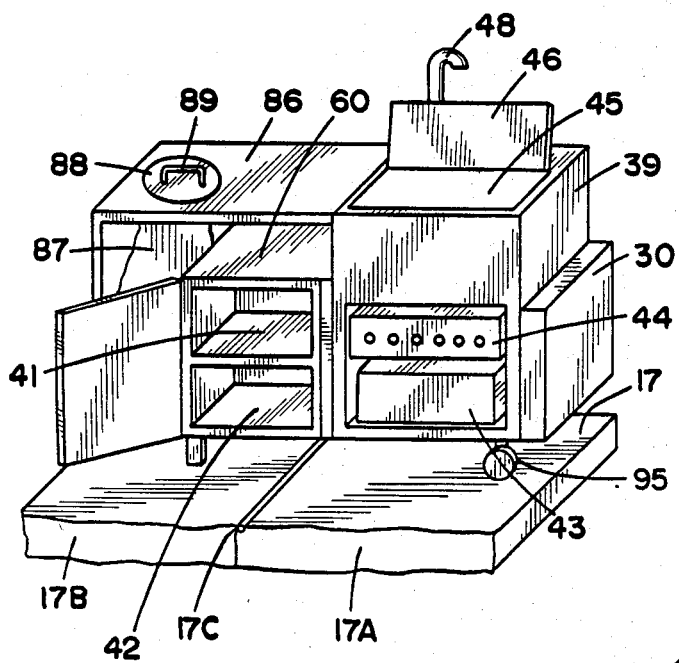
FIG. 5 shows the barbecue unit in my camping and recreation trailer.

FIG. 5 also shows that trailer bed 17 has a first section 17A and a second section 17B which are pivotally connected by a hinge 17C. Hinge 17C permits one to fold the bottom of trailer 17 for storage purposes. Obviously, in a storage condition one would first remove barbecue unit 39. To facilitate in removal of barbecue unit 39, FIG. 5 shows barbecue unit 39 provided with wheels 95 that permit the operator to roll the barbecue unit 39 into a storage area.

I claim:
1. A camping and recreation trailer comprising:
a main frame, said main frame having an underside and a top surface for forming a picnic table, said main frame comprises two sections pivotally hinged to each other;
a pair of wheel mechanisms connected to said main frame, said wheel mechanism detachably mounted to said underside of said main frame to permit removal of said wheel assemblies;

a pair of removable sides on said camping and recreation trailer;

said removable sides having folding legs attached thereto to permit said removable sides to be removed from said camping and recreation trailer to form benches when said folding legs are extended;

a sun and rain canopy mounted to said main frame;

means mounted to said sun and rain canopy and said main frame for raising and lowering said sun and rain canopy from said main frame;

a tongue for towing said camping and recreation trailer, said tongue pivotally connected to said main frame, said tongue operable for folding underneath said camping and recreation trailer to form a stable support leg for said camping and recreation trailer;

a garbage container mounted on said main frame;

a barbecue unit mounted on said main frame; and an opening in said main frame of said camping and recreation trailer to permit ice fishing from said camping and recreation trailer.

2. The invention of claim 1 wherein said main frame, said removable sides and said sun and rain canopy are held in position through a plurality of rods extending therethrough.

3. The invention of claim 2 wherein said wheel assemblies are held in position on said main frame through removable pins.

4. The invention of claim 3 wherein said wheel assemblies include a spring for supporting said camping and recreation trailer.

5. The invention of claim 4 wherein said sun and rain canopy comprises separate sections hinged to one another.

6. The invention of claim 5 wherein said means connecting said sun and rain canopy to said main frame includes a telescoping member and a hand crank for raising and lowering said sun and rain canopy.

7. A camping and recreation trailer comprising:

a main frame, said main frame having an underside and a top surface for forming a picnic table;

a pair of wheel mechanisms connected to said main frame, said wheel mechanism detachably mounted to said underside of said main frame to permit removal of said wheel assemblies;

a pair of removable sides on said camping and recreation trailer;

said removable sides having folding legs attached thereto to permit said removable sides to be removed from said camping and recreation trailer to form benches when said folding legs are extended;

a sun and rain canopy mounted to said main frame, said sun and rain canopy includes side sections and end sections with means in said side sections and said end sections to slide said side sections and said end sections into said sun and rain canopy;

means mounted to said sun and rain canopy and said main frame for raising and lowering said sun and rain canopy from said main frame;

a tongue for towing said camping and recreation trailer, said tongue pivotally connected to said main frame, said tongue operable for folding underneath said camping and recreation trailer to form a stable support leg for said camping and recreation trailer; and an opening in said main frame of said camping and recreation trailer to permit ice fishing from said camping and recreation trailer.

* * * * *